United States Patent [19]

Musschoot

[11] 4,152,255

[45] May 1, 1979

[54] VIBRATORY MATERIAL HANDLING APPARATUS INCLUDING SCREENS

[75] Inventor: Albert Musschoot, Barrington, Ill.

[73] Assignee: General Kinematics Corporation, Barrington, Ill.

[21] Appl. No.: 897,634

[22] Filed: Apr. 17, 1978

[51] Int. Cl.$^{2}$ .......................... B07B 1/36; B65G 25/04

[52] U.S. Cl. .................................... 209/234; 209/235; 209/257; 209/364; 209/437; 74/61; 366/128; 198/753

[58] Field of Search ............... 209/347, 325, 329, 346, 209/365, 365 R, 365 A, 365 B, 366, 366.5, 367, 10, 364, 257, 234, 446, 437, 439, 441, 442, 443; 198/609, 753, 766, 761, 770; 74/61; 366/111, 116, 128; 51/163.1, 163.2

[56] References Cited

U.S. PATENT DOCUMENTS

| | | | |
|---|---|---|---|
| 3,035,699 | 5/1962 | Brüderlein et al. | 209/339 |
| 3,068,996 | 12/1962 | Musschoot | 209/366.5 |
| 3,348,664 | 10/1967 | Renner | 198/761 |
| 3,358,815 | 12/1967 | Musschoot et al. | 198/761 |

*Primary Examiner*—Robert Halper
*Assistant Examiner*—Jon E. Hokanson
*Attorney, Agent, or Firm*—Wegner, Stellman, McCord, Wiles & Wood

[57] ABSTRACT

The invention relates to vibratory material handling apparatus and more particularly to a dual exciter system drive for vibrating the apparatus wherein the exciters are positioned on either side of the center of gravity of the apparatus and direct vibrations at obtuse and acute angles, respectively, through the center of gravity of the apparauts, the arrangement being much whereby the vibratory force exerted by each exciter may selectively be varied so as to cause the apparatus to vibrate vertically, or displaced from the vertical, so as to convey in one direction or the opposite direction. The arrangement is such that the spring system connecting the exciters to the material-handling apparatus acts as isolation springs when the vibration generator associated therewith is inoperative, and as tuned natural frequency systems when the vibrator is actuating. The invention also provides a shakeout screen and sand lump breaking apparatus combined into a single unit, thereby providing an apparatus particularly useful in removing foundry sand from castings and breaking down lumps in the sand to permit the reuse thereof.

6 Claims, 3 Drawing Figures

VIBRATORY MATERIAL HANDLING APPARATUS INCLUDING SCREENS

BACKGROUND OF THE INVENTION

The use of more than one vibration generator associated with vibratory material handling apparatus to provide selectable conveying directions is not new. For example, Musschoot U.S. Pat. Nos. 2,712,459, 3,793,780 and 4,025,419 show systems wherein electric motors rotate shafts each carrying an eccentric weight, with the motors being attached directly to the vibrating apparatus. The previous systems shown in said patents were "brute force" systems requiring heavy duty motors to generate the vibratory forces necessary. Tuned exciter natural frequency systems were not used in such multi-vibration generator arrangements perhaps for the reason that such natural frequency spring exciter systems would continue to vibrate with the material-carrying part of the apparatus even though the vibration generator associated therewith had been de-energized.

Referring again to prior apparatus in this field, it has been customary in the past to remove foundry sand from a casting through what is known in the industry as a shakeout screen. Basically, this comprised a grating mounted for vibratory movement and the sand and casting were placed thereon with the vibrations serving to remove the sand from the casting. As foundry sand is expensive, the sand so removed was rendered reusable by treating it in a separate lump breaking apparatus, often consisting of apparatus similar to that shown in the Musschoot U.S. Pat. No. 4,025,419 referred to above.

SUMMARY OF THE PRESENT INVENTION

According to the present invention, two natural frequency exciter type drives are provided, positioned on either side of the center of gravity of the vibratory apparatus. The exciter mass of each exciter assembly is connected to the vibratory apparatus through a spring system in which the springs have a relatively high spring rate in the direction of vibration-generating movement of the exciter mass, and a relatively low spring rate in a direction normal thereto. The exciter assemblies are arranged so that the direction of vibration is along a line passing through the center of gravity of the material-carrying member, and inasmuch as the exciter members are positioned on either side of the center of gravity, such lines intersect at the center of gravity preferably at an angle of 90 degrees. When both exciter assemblies are operated, the resultant force on the vibratory material-carrying apparatus produces vertical vibrations. If the vibration generator associated with one exciter assembly is de-energized, the other exciter assembly will produce vibrations at an angle to the vertical, i.e., one which produces conveying vibrational movement of the material-carrying apparatus. The de-energized exciter mass will, because it is connected to the vibratory material carrying apparatus by a spring system having a low spring rate normal to its operating direction, be in effect isolated from the vibratory material-carrying member. Hence, the exciter mass of the de-energized exciter system will remain substantially motionless.

The vibratory material-carrying apparatus includes a screen or grating on the top, on which a casting covered with sand may be placed and when the apparatus is vibrating, the grating acts as a shakeout screen freeing the casting of sand, with the sand so removed from the casting falling into a bed within the apparatus where the vibratory action breaks up lumps in the sand. By de-energizing one of the vibration generators associated with one of the exciter assemblies, the sand and castings can be conveyed to a discharge for removal from the apparatus and periodically the other exciter assembly may be de-energized so that unbreakable material left over from the lump breaking operation may be discharged at the opposite end of the apparatus.

All of the foregoing will be more clearly evident from the following description and drawings.

DESCRIPTION OF THE PREFERRED EMBODIMENT

Figure 1:
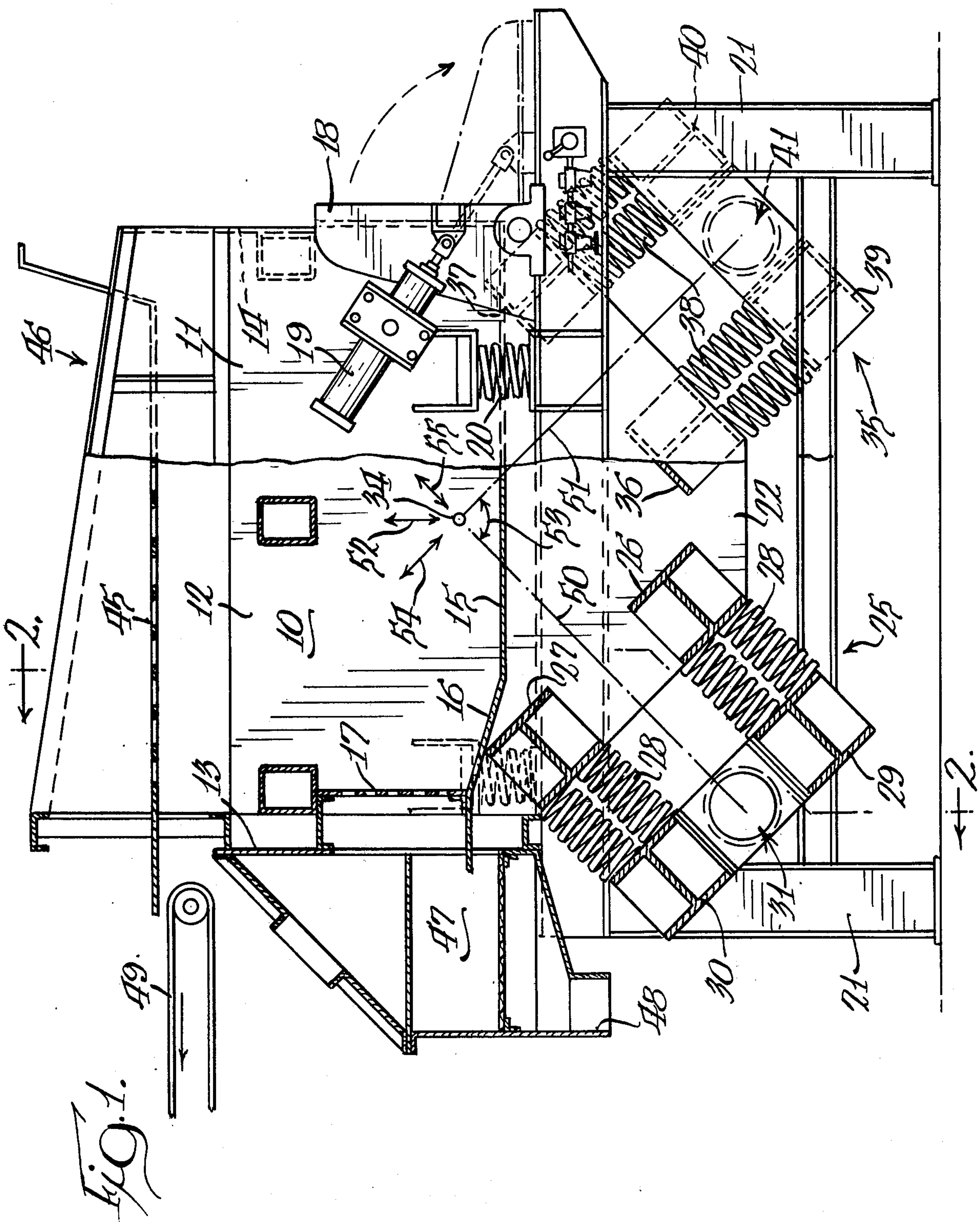
FIG. 1 is a side elevational view partly broken away and partly in section showing apparatus embodying the present invention.
Figure 2:
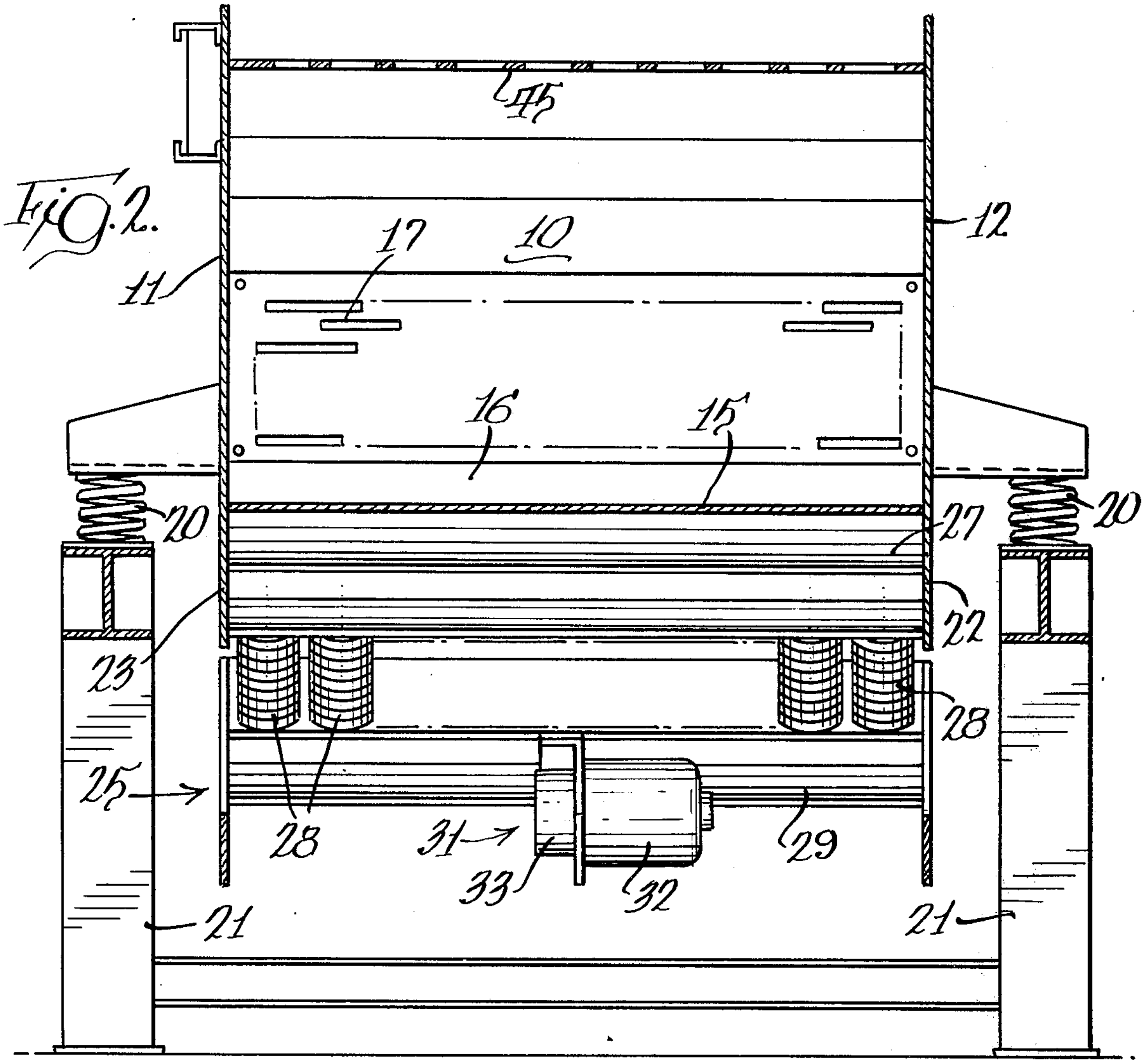
FIG. 2 is an end view of the apparatus shown in FIG. 1.

Referring now to FIGS. 1 and 2 of the drawings, there is shown a vibratory material handling apparatus including an open-top material-carrying member 10 having side walls 11 and 12, and end walls 13 and 14. The bottom 15 of the member 10 forms a bed having an upwardly slanting portion 16 leading to a screen 17 at one end of the member 10. At the opposite end of the member is a door 18 operable by a piston and cylinder device 19 which serves to pivot the door between the open and closed positions illustrated.

The material-carrying member 10 is supported for vibratory movement on isolation springs 20 supported on a base 21. The side walls 11 and 12 have downwardly extending portions 22 and 23. Suspended from the downwardly extending portions is a first exciter assembly 25 including a pair of I-beams 26 and 27 extending between the portions 22 and 23. A plurality of parallel coil springs 28 are provided with each spring having one end connected to one of the I-beams 26, 27, and having its other end connected to a second pair of I-beams 29, 30. Secured to and between the I-beams 29 and 30 is a vibration generator 31 including an electric motor 32 carrying an eccentric weight apparatus 33. Preferably, the vibration generator is of the type shown in Musschoot U.S. Pat. No. 3,358,815, i.e., one where the degree of eccentric force generated with rotation of the weight can be varied between zero and maximum.

The I-beams 29 and 30 and the vibration generator 31 constitute an exciter mass which is positioned on one side of the center of gravity indicated at 34 of the material-carrying member.

A second exciter assembly 35 is suspended from the downwardly extending portions 22, 23 on the opposite side of the center of gravity as the exciter assembly 25. The second exciter assembly includes a pair of I-beams 36 and 37 extending from end to end of the apparatus like the I-beams 26 and 27, a plurality of coil springs 38 each secured at one end to one of the I-beams 36, 37, and at its other end to a pair of I-beams 39, 40 extending between the portions 22, 23 like the I-beams 29, 30. A vibration generator 41 is secured to and located between the I-beams 39 and 40, the vibration generator 41 being of the same type as the vibration generator 31.

Secured to the top of the material-carrying member 10 is a grating 45 positioned to receive sand coated castings. The grating 45 is located over the open top of the material-carrying member and is supported by the supporting structure 46, in turn carried by the member 10. On the outer side of the screen 17 there is provided a chamber 47 having a chute 48 for directing sand coming from the interior of the material-carrying member into a suitable conveyor or container.

The vibration generators 31 and 41 are equal in force-generating ability and thus when energized the exciter mass 25 will vibrate along the line 50 parallel to the axis of the springs 28 and intersecting the center of gravity 34. The line 50 as illustrated extends at an acute angle to the horizontal. Similarly, when the exciter mass 35 is energized through energization of the vibration generator 41, that exciter mass will vibrate along the line 51 which extends parallel to the axis of the coil springs 38 and also intersects the center of gravity 34. The line 51 extends at an obtuse angle to the horizontal.

The exciter assemblies 25 and 35 are tuned natural frequency systems, i.e., the rate of rotation of the eccentric weights of each vibration generator approaches the natural frequency of the coil springs, acting in compression, associated with each assembly. When both are operated with equal force, the direction of vibration of the material-carrying member 10 will be vertical, i.e., in a direction bi-secting the angle 53 formed by the intersection of lines 50 and 51, such direction of vibration being indicated by the arrow 52. If the vibratory force of one of the vibration generators is reduced (as is possible with the system shown in the Musschoot U.S. Pat. No. 3,358,815), the line of direction of vibration of the material-carrying member 10 will move from the vertical to a slanted position toward that exciter assembly subject to the reduced force. If one exciter assembly, for example assembly 25, is de-energized completely, vibrations will be in the direction of the arrow 54, while if the other exciter assembly 35 is the one de-energized, the vibrations will be in the direction of the arrow 55. Vibrations in directions between 54 and 52, or between 55 and 52, may be achieved by only partial reduction of the vibratory force.

Coil springs 28 have a relatively high spring rate along their axis and a much lower spring rate in a direction normal to their axis. Thus, when vibration generator 31, for example, is de-energized and exciter assembly 35 is producing vibrations in the direction of arrow 54, that direction is normal to the axis of the coil springs 28 and thus at their lower spring rate. In this situation, the springs 28 act as isolation springs isolating the exciter mass comprising the I-beams 29, 30 and vibration generator 31, from the rest of the vibrating apparatus. Thus, that exciter mass will remain substantially stationary. The other exciter mass comprising the I-beams 39, 40 and vibration generator 41 are subject to the same phenomena and when that vibration generator is de-energized while the vibration generator 31 is operating, coil springs 38 will act as isolation springs in a similar manner.

It will be noted that when both vibration generators 31 and 41 are operating equally to produce vibratory force, the material-carrying member 10 will be vibrating in a vertical direction as indicated by the line 52. In this situation, the lower ends of springs 28 will be moving in a direction parallel to the line 50 while the upper ends of those springs will be moving in a direction parallel to the line 52. Similarly, the lower ends of springs 38 will be moving in a direction parallel to the line 51 while their upper ends will be moving vertically parallel to the line 52. As noted above, the spring rate of the springs is lower in the direction normal to their axes and thus with part of the springs operating in an off-axis direction, the overall spring rate of the springs 28 and 38 will be lower than their spring rate when operating only along their axes. Under the conditions described, both exciter assemblies will be acting together to provide the force to vibrate the material-carrying member vertically. However, when one of the vibration generators, for example the vibration generator 31, is moved to zero output, the springs 38 will be operating entirely along a line parallel to the line 51, and hence the spring rate for those springs will be higher than when both vibration generators are operating equally. Thus, exciter member 35 is actuating the total mass of the material-carrying member, i.e., is providing the sole force for vibrating the material-carrying member. However, the spring rate of the springs 38 is now at a maximum as both ends of the springs are moving along the same axis. This can then be designed so that the natural frequency of the system, when only one exciter assembly is operating, can still be in the resonant range.

In operating the device, a casting embedded in sand may be placed on the grating 45 and both vibration generators 31 and 41 activated. This will produce vibrations in a vertical direction as indicated by the arrow 52. The grating 45 acts as a shakeout screen and sand will fall therethrough onto the bed 15. Sand falling on the bed is of course subject to the vibrations generated which serve to break up lumps of the sand and put it into reusable condition. When sufficient time has elapsed to accomplish removal of sand from the casting and the breaking up of lumps in the removed sand, vibration generator 31 may be de-energized whereupon the material-carrying apparatus will vibrate in the direction of arrow 54, conveying the casting off the grating 45 and onto a belt conveyor 49, while the sand on the bed 15 will be conveyed toward and through the screen 17 into chamber 47, out the chute 48, into a container or conveyor. Periodically, the vibration generator 41 may be de-energized while vibration generator 31 is operating to convey accumulation of material and other uncrushable portions in a direction to the right as shown in FIG. 1, and piston and cylinder device 19 operated to open the door 18 permitting such accumulation to be conveyed out of the apparatus to a suitable container.

The apparatus of the present invention can also be used as a continuous system by adjusting the vibration generator 31 so that it is producing vibrations of less force than the vibration generator 41. This will produce a slow conveying action from right to left, and the speed of the action can be easily adjusted so that castings on grating 45 and sand on bed 15 remain, respectively, on the grating and bed sufficiently long to remove sand from the casting and to break up the lumps, and yet progress slowly toward the discharge (left-hand) end of the apparatus. Even in such continuous operations, it will be found advisable periodically to reverse the direction of conveying so as to remove uncrushable material through the door 18.

It will be apparent to those skilled in the art that the multiple tuned frequency exciter system shown in the drawings can be used on apparatus other than shakeout sand reclaiming combinations, inasmuch as there is provided a tuned frequency system which can be easily and accurately regulated to produce maximum or minimum vibrations in a direction producing conveying action in one direction or the other, or no conveying action at all.

Figure 3:
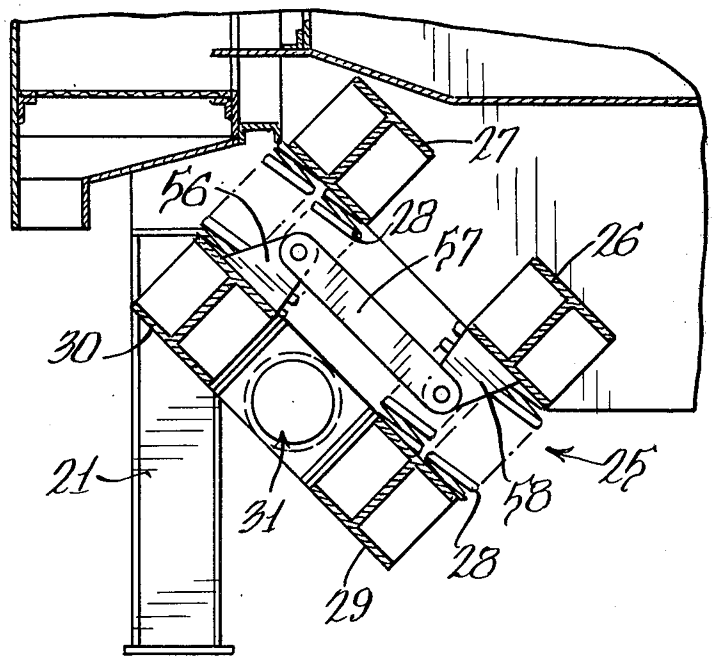
FIG. 3 shows a modified form of mounting for the exciter assembly.

In the event it is thought desirable to provide some guide means for the exciter masses, a simple link arrangement such as shown in FIG. 3 may be used. The arrangement includes a bracket 56 secured to the I-beam 30 and pivotally connected to a link 57, in turn pivotally connected to a second bracket 58 secured to the I-beam 26.

I claim:

1. Vibratory apparatus comprising a material-carrying member, means mounting said material-carrying member for vibratory movement, a first exciter assembly positioned below and horizontally displaced in one direction from the center of gravity of the material-carrying member, said first exciter assembly including a first exciter mass, a plurality of parallel coil springs each connected at one end to the exciter mass and at the other end to the material-carrying member, said coil springs carrying said first exciter mass for vibratory movement along a line parallel to the axis of said springs and making an acute angle with the horizontal, said first line passing through the center of gravity of the material-carrying member, a second exciter assembly positioned below and equally horizontally displaced in the opposite direction from the center of gravity of the material-carrying member, said second exciter assembly including a second exciter mass, a second plurality of parallel coil springs each connected at one end to the second exciter mass and at the other end to the material-carrying member, said second plurality of coil springs carrying said second exciter mass for vibratory movement along a second line parallel to the axis of the second plurality of springs and making an obtuse angle with the horizontal, said second line passing through said center of gravity of the material-carrying member, and a variable force vibration generator associated with each exciter mass, each of said vibration generators including an electric motor having a shaft, a pair of weights carried on the shaft, and means for varying the eccentricity of the weights relative to the shaft, rotation of each of said shafts serving to vibrate the first and second exciter masses along said first and second lines respectively.

2. Vibratory apparatus comprising a material-carrying member, means mounting said material-carrying member for vibratory movement, a first exciter assembly positioned below and horizontally displaced in one direction from the center of gravity of the material-carrying member, said first exciter assembly including a first exciter mass, a plurality of parallel coil springs each connected at one end to the exciter mass and at the other end to the material-carrying member, said coil springs carrying said first exciter mass for vibratory movement along a line parallel to the axis of said springs and making an acute angle with the horizontal, said first line passing through the center of gravity of the material-carrying member, a second exciter assembly positioned below and equally horizontally displaced in the opposite direction from the center of gravity of the material-carrying member, said second exciter assembly including a second exciter mass, a second plurality of parallel coil springs each connected at one end to the second exciter mass and at the other end to the material-carrying member, said second plurality of coil springs carrying said second exciter mass for vibratory movement along a second line parallel to the axis of the second plurality of springs and making an obtuse angle with the horizontal, said second line passing through said center of gravity of the material-carrying member, a first variable force vibration generator carried by the first exciter mass, a second variable force vibration generator carried by the second exciter mass, each of said vibration generators including an electric motor having a shaft, a pair of weights carried on the shaft, and means for varying the eccentricity of the weights relative to the shaft for varying the vibrational force exerted by each of said vibration generators between zero and maximum whereby to vary the magnitude and direction of vibrational forces imparted to said material-carrying member.

3. Vibratory apparatus comprising a material-carrying member, means mounting said material-carrying member for vibratory movement, a first exciter assembly positioned below and horizontally displaced in one direction from the center of gravity of the material-carrying member, said first exciter assembly including a first exciter mass, a plurality of parallel coil springs each connected at one end of the exciter mass and at the other end to the material-carrying member, said coil springs carrying said first exciter mass for vibratory movement along a line parallel to the axis of said springs and making an acute angle with the horizontal, said first line passing through the center of gravity of the material-carrying member, a second exciter assembly positioned below and equally horizontally displaced in the opposite direction from the center of gravity of the material-carrying member, said second exciter assembly including a second exciter mass, a second plurality of parallel coil springs each connected at one end to the second exciter mass and at the other end to the material-carrying member, said second plurality of coil springs carrying said second exciter mass for vibratory movement along a second line parallel to the axis of the second plurality of springs and making an obtuse angle with the horizontal, said second line passing through said center of gravity of the material-carrying member and intersecting said first line at an angle of approximately 90 degrees, a first variable force vibration generator carried by the first exciter mass, a second variable force vibration generator carried by the second exciter mass, each of said vibration generators including an electric motor having a shaft, a pair of weights carried on the shaft, and means for varying the eccentricity of the weights relative to the shaft for varying the vibrational force exerted by each of said vibration generators between zero and maximum whereby to vary the magnitude and direction of vibrational forces imparted to said material-carrying member.

4. Vibratory apparatus comprising an open top material-carrying member having a bed at the bottom, side walls extending upwardly from the bed and end walls extending upwardly from the bed, a screen at one end of the bed, a door at the other end of the bed, a grating on the material-carrying member and positioned over the bed, means mounting said material-carrying member for vibratory movement, selectively operable means for vibrating said material-carrying member comprising a first exciter assembly including a first exciter mass, first spring means connected between the first exciter mass and the material-carrying member and carrying said exciter mass for vibratory movement along a first line making an acute angle with the horizontal and passing through the center of gravity of the material-carrying member, a second exciter assembly including a second exciter mass, second spring means connected between the second exciter mass and the material-carrying member and carrying said second exciter mass for vibratory movement along a second line making an obtuse angle with the horizontal and passing through said center of gravity of the material-carrying member, a vibration generator associated with each exciter mass and selectively operable to vibrate the first and second exciter masses along said first and second lines respectively, the arrangement being such that operation of both said vibration generators with equal force causes the material-carrying member to vibrate along a line bisecting the angle formed by the intersection of said first and second line at said center of gravity and operation of either one of said vibration generators causes the material-carrying member to vibrate along a line substantially parallel to the line from the operating exciter mass through the center of gravity of the material-carrying member.

5. Vibratory apparatus comprising an open top material-carrying member having a bed at the bottom, side walls extending upwardly from the bed and end walls extending upwardly from the bed, a screen at one end of the bed, a door at the other end of the bed, a grating on the material-carrying member and positioned over the bed, means mounting said material-carrying member for vibratory movement, selectively operable means for vibrating said material-carrying member in a first vertical direction to shake off sand clinging to a casting placed on said grating and to break down lumps of sand removed from the casting and falling to the bed, said vibrating means being selectively operable to vibrate said material-carrying member in a direction inclined toward said screen to cause lump-free sand to move through said screen and to cause the casting on the grating to move off the grating, and said vibrating means being selectively operable to vibrate said material-carrying member in a third direction to convey uncrushable material on the bed to and out of said door.

6. The vibratory apparatus of claim 5 including a conveyor positioned at the end of and below said grating to receive castings therefrom.

* * * * *